United States Patent [19]

Loucks et al.

[11] Patent Number: 5,481,720
[45] Date of Patent: Jan. 2, 1996

[54] FLEXIBLE INTERFACE TO AUTHENTICATION SERVICES IN A DISTRIBUTED DATA PROCESSING ENVIRONMENT

[75] Inventors: Larry K. Loucks; Todd A. Smith, both of Austin, Tex.

[73] Assignee: International Business Machines Corporation, Armonk, N.Y.

[21] Appl. No.: 306,224

[22] Filed: Sep. 14, 1994

Related U.S. Application Data

[63] Continuation of Ser. No. 751,603, Aug. 21, 1991, abandoned, which is a continuation of Ser. No. 352,518, May 15, 1989, abandoned.

[51] Int. Cl.$^6$ ............................ G06F 12/14; G06F 13/14
[52] U.S. Cl. .......................... 395/700; 395/427; 395/728; 364/284.2; 364/286.5
[58] Field of Search ..................................... 395/700, 650, 395/600

[56] References Cited

U.S. PATENT DOCUMENTS

| | | | |
|---|---|---|---|
| 4,317,957 | 3/1982 | Sendrow | 178/22.08 |
| 4,423,287 | 12/1983 | Zeidler | 178/22.08 |
| 4,484,306 | 11/1984 | Kulezyckyj et al. | |
| 4,578,530 | 3/1986 | Zeidler | 340/825.34 |
| 4,652,990 | 3/1987 | Pailen et al. | 364/200 |
| 4,672,572 | 6/1987 | Alsberg | 364/900 |
| 4,685,055 | 8/1987 | Thomas | 364/200 |
| 4,694,492 | 9/1987 | Wirstrom et al. | |
| 4,800,488 | 1/1989 | Agrawal et al. | 364/200 |
| 4,815,031 | 3/1989 | Furukawa | 364/900 |
| 4,858,117 | 8/1989 | DiChiara et al. | 364/200 |
| 4,933,969 | 6/1990 | Marshall et al. | 340/825.34 |
| 4,980,913 | 12/1990 | Skret | 340/825.07 |
| 5,077,694 | 12/1991 | Sansone et al. | 395/600 |

FOREIGN PATENT DOCUMENTS 0268141  5/1988  European Pat. Off. .

OTHER PUBLICATIONS

Rosenberg, Jerry M., Dictionary of Computers, Information Processing & Telecommunications, 2nd ed., 1987, p. 392.
S. P. Miller et al, "Kerberos Authentication and Authorization System", Massachusetts Institute of Technology, Oct. 27, 1988, pp. 1–36.
J. G. Steiner et al, "Kerberos: An Authentication Service for Open Network Systems", Winter USENIX 1988, Dallas, Tex., pp. 1–15.
Kleiman, S. R., "Vnodes: An Architecture for Multiple File System Types in Sun UNIX", pp. 238–247.
Sandberg, R. et al, "Design and Implementation of the Sun Network Filesystem", pp. 119–130.
Walsh, Dan et al, "Overview of the Sun Network File System", pp. 117–124.
Chang, JoMei, "Status Monitor Provides Network Locking Service for NFS", pp. 1–3.
Chang, JoMei, "SunNet", pp. 71–75.
Taylor, Bradley, "Secure Networking in the Sun Environment", pp. 28–36.
Rifkin et al, "RFS Architectural Overview", pp. 1–12.
Hamilton, Richard et al, "An Administrator's View of Remote File Sharing", pp. 1–9.
Houghton, Tom et al, "File System Switch", pp. 1–2.
Olander, David J. et al, "A Framework for Networking in System V" pp. 1–8.

Primary Examiner—Kevin A. Kriess
Assistant Examiner—John I. Chavis
Attorney, Agent, or Firm—Marilyn D. Dawkins; Wayne P. Bailey; Robert M. Caruell

[57] ABSTRACT

In a distributed data processing system, the authentication of a process at one node for the use of a service at another node is performed in a facility that is separate from the requestor and service process. The separate facility is also replaceable, thereby allowing different authentication policies to be implemented within the distributed data processing system. The requesting process and the service process merely pass the authentication information between themselves without attempting to interpret the work of the separate authentication facility. In addition to authenticating the requestor to the service, the service is also authenticated to the requestor.

4 Claims, 7 Drawing Sheets

REQUEST_FOR_SERVICE

REQUEST

REPLY

REQUESTOR TO AUTHENTICATION AGENT MESSAGE

AUTHENTICATION AGENT TO REQUESTOR MESSAGE

SERVICE TO AUTHENTICATION AGENT MESSAGE

AUTHENTICATION AGENT TO SERVICE MESSAGE

FLEXIBLE INTERFACE TO AUTHENTICATION SERVICES IN A DISTRIBUTED DATA PROCESSING ENVIRONMENT

This is a continuation of application Ser. No. 07/751,603, filed on Aug. 21, 1991 which is a continuation of application Ser. No. 07/352,518 filed May 15, 1989, both now abandoned.

Application Ser. No. 07/014,897 filed Feb. 13, 1987, in the name of Johnson et al for "A System And Method for Accessing Remote Files In A Distributed Networking Environment", now U.S. Pat. No. 4,887,204, herein incorporated by reference.

Application Ser. No. 07/352,090 filed May 15, 1989, in the name of Johnson et al for "Maintenance Of File Attributes In A Distributed Data Processing System", now U.S. Pat. No. 5,113,519 herein incorporated by reference.

Application Ser. No. 07/898,234, Jun. 12, 1992; continuation of Ser. No. 07/739, Aug. 1, 1991, abandoned; continuation of 07/352,220, abandoned, filed May 15, 1989, in the name of Morgan et al for "File Extension By Clients In A Distributed Data Processing System", now U.S. Pat. No. 5,305,440, herein incorporated by reference.

Application Ser. No. 07/352,025 filed May 15, 1989, now U.S. Pat. No. 4,908,978, in the name of Johnson et al for "Remote Authentication And Authorization In A Distributed Data Processing System", herein incorporated by reference.

Application Ser. No. 07/893,959, Jun. 4, 1992; continuation of Ser. No. 07/352,080 filed May 15, 1989, now abandoned in the name of D. W. Johnson et al for "File Lock Management In A Distributed Data Processing System", now U.S. Pat. No. 5,226,159, herein incorporated by reference.

Application Ser. No. 07/352,084 filed May 15, 1989, in the name of D. W. Johnson et al for "System and Method For Efficient Control of Cached Data In A Distributed Data Processing System", now U.S. Pat. No. 5,175,851, herein incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to a plurality of data processing systems connected by a communications link, and more particularly to the authentication of a process at one of the data processing systems for the use of a service at another one the data processing systems in a distributed networking environment.

2. Description of the Related Art

As shown in FIG. 1, a distributed networking environment 1 consists of two or more nodes A, B, C, connected through a communication link or a network 3. The network 3 can be either a local area network (LAN), or a wide area network (WAN).

At any of the nodes A, B, C, there may be a processing system 10A, 10B, 10C, such as a workstation. Each of these processing systems 10A, 10B, 10C, may be a single user system or a multi-user system with the ability to use the network 3 to access files located at a remote node. For example, the processing system 10A at local node A, is able to access the files 5B, 5C at the remote nodes B, C, respectively.

Within this document, the term "server" will be used to indicate the processing system where the file is permanently stored, and the term "client" will be used to mean any other processing system having processes accessing the file. It is to be understood, however, that the term "server" does not mean a dedicated server as that term is used in some local area network systems. The distributed services system in which the invention is implemented is truly a distributed system supporting a wide variety of applications running at different nodes in the system which may access files located anywhere in the system.

As mentioned, the invention to be described hereinafter is directed to a distributed data processing system in a communication network. In this environment, each processor at a node in the network potentially may access all the files in the network no matter at which nodes the files may reside.

Other approaches to supporting a distributed data processing system are known. For example, IBM's Distributed Services for the AIX operating system is disclosed in Ser. No. 014,897 "A System and Method for Accessing Remote Files in a Distributed Networking Environment", filed Feb. 13, 1987 in the name of Johnson et al. In addition, Sun Microsystems has released a Network File System (NFS) and Bell Laboratories has developed a Remote File System (RFS). The Sun Microsystems NFS has been described in a series of publications including S. R. Kleiman, "Vnodes: An Architecture for Multiple File System Types in Sun UNIX", *Conference Proceedings, USENIX* 1986 *Summer Technical Conference and Exhibition*, pp. 238 to 247; Russel Sandberg et al., "Design and Implementation of the Sun Network Filesystem", *Conference Proceedings, Usenix* 1985, pp. 119 to 130; Dan Walsh et al., "Overview of the Sun Network File System", pp. 117 to 124; JoMei Chang, "Status Monitor Provides Network Locking Service for NFS", JoMei Chang, "SunNet", pp. 71 to 75; and Bradley Taylor, "Secure Networking in the Sun Environment", pp. 28 to 36. The AT&T RFS has also been described in a series of publications including Andrew P. Rifkin et al., "RFS Architectural Overview", *USENIX Conference Proceedings*, Atlanta, Ga. (June 1986), pp. 1 to 12; Richard Hamilton et al., "An Administrator's View of Remote File Sharing", pp. 1 to 9; Tom Houghton et al., "File Systems Switch", pp. 1 to 2; and David J. Olander et al., "A Framework for Networking in System V", pp. 1 to 8.

One feature of the distributed services system in which the subject invention is implemented which distinguishes it from the Sun Microsystems NFS, for example, is that Sun's approach was to design what is essentially a stateless server. This means that the server does not store any information about client nodes, including such information as which client nodes have a server file open or whether client processes have a file open in read_ only or read_ write modes. Such an implementation simplifies the design of the server because the server does not have to deal with error recovery situations which may arise when a client fails or goes off-line without properly informing the server that it is releasing its claim on server resources.

An entirely different approach was taken in the design of the distributed services system in which the present invention is implemented. More specifically, the distributed services system may be characterized as a "stateful implementation". A "stateful" server, such as that described here, does keep information about who is using its files and how the files are being used. This requires that the server have some way to detect the loss of contact with a client so that accumulated state information about that client can be discarded. The cache management strategies described here cannot be implemented unless the server keeps such state information.

The problems encountered in accessing remote nodes can be better understood by first examining how a stand-alone system accesses files. In a stand alone system, such as 10 as shown in FIG. 2, a local buffer 12 in the operating system 11 is used to buffer the data transferred between the permanent storage 2, such as a hard file or a disk in a workstation, and the user address space 14. The local buffer 12 in the operating system 11 is also referred to as a local cache or kernel buffer.

In the stand-alone system, the kernel buffer 12 is divided into blocks 15 which are identified by device number, and logical block number within the device. When a read system call 16 is issued, it is issued with a file descriptor of the file 5 for a byte range within the file 5, as shown in step 101, FIG. 3. The operating system 11 takes this information and converts it to device number, and logical block numbers in the device, step 102, FIG. 3. If the block is in the cache, step 103, the data is obtained directly from the cache, step 105. In the case where the cache doesn't hold the sought for block at step 103, the data is read into the cache in step 104 before proceeding with step 105 where the data is obtained from the cache.

Any data read from the disk 2 is kept in the cache block 15 until the cache block 15 is needed for some other purpose. Consequently, any successive read requests from an application 4 that is running on the processing system 10 for the same data previously read is accessed from the cache 12 and not the disk 2. Reading from the cache is far less time consuming than reading from the disk.

Similarly, data written from the application 4 is not saved immediately on the disk 2, but is written to the cache 12. This saves disk accesses if another write operation is issued to the same block. Modified data blocks in the cache 12 are saved on the disk 2 periodically.

Use of a cache in a stand-alone system that utilizes an AIX operating system improves the overall performance of the system since disk accessing is eliminated for successive reads and writes. Overall performance is enhanced because accessing permanent storage is slower and more expensive than accessing a cache.

In a distributed environment, as shown in FIG. 1, there are two ways the processing system 10C in local node C could read the file 5A from node A. In one way, the processing system 10C could copy the whole file 5A, and then read it as if it were a local file 5C residing at node C. Reading a file in this way creates a problem if another processing system 10A at another node A modifies the file 5A after the file 5A has been copied at node C as file 5C. The processing system 10C would not have access to these latest modifications to the file 5A.

Another way for processing system 10C to access a file 5A at node A is to read one block, e.g. N1, at a time as the processing system at node C requires it. A problem with this method is that every read has to go across the network communication link 3 to the node A where the file resides. Sending the data for every successive read is time consuming.

Accessing files across a network presents two competing problems as illustrated above. One problem involves the time required to transmit data across the network for successive reads and writes. On the other hand, if the file data is stored in the node to reduce network traffic, the file integrity may be lost. For example, if one of the several nodes is also writing to the file, the other nodes accessing the file may not be accessing the latest updated data that has just been written. As such, the file integrity is lost since a node may be accessing incorrect add outdated files.

In a stand-alone data processing system, file access control is often provided in order to protect sensitive information that users do not want to share with each other. A problem confronted with distributed data processing systems is how to distribute this same model of control and provide secure access to a user's information remotely while keeping other remote users from inadvertently or maliciously accessing or manipulating data belonging to another user.

Two problems that must be solved in order to provide a secure remote access for users are authentication and authorization. Authentication is the process of identifying a user of a data processing system. Users typically accomplish authentication by presenting the user's name, or account number for the system, followed by a secret password which should only be known by that user. Presenting the secret password, which can be validated by the system, allows the system to authenticate the user to be who the user claims to be. Once authenticated, the system may then authorize this user to have access to resources managed by the data processing system. Therefore, authentication is the identification of a user, and authorization is the granting of a privilege to a user to gain some kind of access to the system.

As mentioned above, authentication of local users is often accomplished through the use of a shared secret. This secret is typically a password which the user enters at a prompt. The system then compares this password to a recorded version of the password. If the system determines that the password is correct, the user is authenticated. Remote authentication is more difficult than that previously described.

A procedure for remote authentication is described in the following papers. "Kerberos: An Authentication Service For Open Network Systems", Steiner, Jennifer G.; Neuman, Clifford; Schiller, Jeffrey I.; pages 1–15, USENIX, Dallas, Tex., Winter, 1988. "Project Athena Technical Plan, Section E.2.1, Kerberos Authentication and Authorization System", Miller, S. P.; Neuman, B. C.; Schiller, J. I.; Saltzer, J. H.; pages 1–36, Massachusetts Institute of Technology, Oct. 27, 1988. These above two references are herein incorporated by reference. This Kerberos based remote authentication authenticates users working at one node in a distributed data processing system to services running on the same node or other nodes in the distributed system. A distinctive property of the Kerberos protocol is that users can be authenticated with services running on nodes which share no secret with the user. If a simple password based authentication scheme were used, each user would have to share a secret with each machine in the entire distributed system. By using the Kerberos protocol, users need to share a secret with only one machine; the machine running the Kerberos authentication service.

Kerberos authentication works as follows. In order to be authenticated to a remote service, the user must present a specially constructed data structure, called a ticket, to the service that the user wishes to be authenticated to. This ticket is particular to the user and the service. That is, each service requires that these tickets are tickets intended for that service. Moreover, these tickets are specially constructed for an individual user who wants to be authenticated. These tickets are issued by the part of the Kerberos authentication server called the ticket granting service. Before using the service, say a remote print server, a user acquires a ticket for that print server. The user requests the Kerberos ticket granting service to issue a ticket for that user for the use of the print server. The Kerberos ticket granting service constructs the ticket, gives it to the user, and the user presents it to the print server. The print server examines the ticket and can determine that the sender was indeed the claimed user.

In detail, this Kerberos scheme is more complex in order to ensure that tickets can not be forged or stolen by another user. ID addition, the messages for passing tickets between machines are designed such that the messages can not be recorded and replayed. The Kerberos scheme also ensures that the the user can not trick the ticket granting service itself. This last step can be accomplished by requiring a ticket to use the ticket granting service. This master ticket is acquired by users before any other ticket can be issued for that user. Once a user has a master ticket, the user can present the master ticket to the ticket granting service and be issued tickets for other services in the distributed system.

Another distinctive feature of the Kerberos authentication scheme is that while the user must go to the authentication server to request tickets, the service to which these tickets are being presented does not need to communicate with the Kerberos authentication service during the user authentication.

The Kerberos protocol provides a sophisticated authentication scheme. However, such schemes are not appropriate for small networks where the overhead in administering a Kerberos server may not justify its use. In such cases, other authentication schemes are possible which may just simply involve the sharing of a secret between every user and every node in the distributed system. If the distributed system has only a few machines, such as three or so, it may be easier for each user to maintain a password on each machine and to authenticate that password periodically to ensure that the users are not compromised.

A third possible authentication scheme might be appropriate for networks that are larger than those that can be conveniently managed by users needing individual passwords on each machine yet are smaller than would justify a Kerberos authentication protocol. This third scheme might use a centralized authentication server which all of the nodes communicate with. A password might be presented to a remote service by a user, and the remote service checks with the central authentication server to determine whether the password is correct. This requires services to communicate with the authentication server instead of users. This is in contrast to the Kerberos scheme where services do not need to communicate with the authentication server during user authentication.

As illustrated above, there is a wide range of possible implementations of authentication servers that may be appropriate for distributed systems providing user authentication.

An operating system, such as the AIX operating system, which provides for distributed functions such as in Distributed Services of the AIX operating system, uses remote authentication to authenticate client machines to servers, servers to client machines, and users to server machines. However, it may be desirable to run an operating system having distributed functions in various sizes of networks having a range of nodes from one or two nodes to hundreds or thousands of nodes. Consequently, an operating system providing distributed functions must run in the presence of various authentication schemes from the simplest most straight forward scheme to the most complex and sophisticated scheme.

An efficient way of implementing a distributed services function of an operating system is to modify the operating system kernel to support distributed service operations. This includes the communication between nodes and the management add synchronization of the facilities being distributed. When a user operation on one machine causes a request to be sent to a remote machine, that user must be authenticated to the remote machine. This activity causes programs to be executed at the remote machine. The distributed service function of the operating system must perform the authentication of the remote user, but to do so, it must use the network's authentication scheme, for which various schemes are possible and can operate very differently from one another. Additionally, this authentication may require communications with the remote authentication server at either the user side or at the remote machine side. Since it is impossible to anticipate all possible authentication schemes that the network may be using, it is desirable for a distributed service function of the operating system to have a flexible authentication protocol that allows it to use whatever available authentication scheme is running on the network.

For example, a distributed service of the operating system gets to a remote machine with a request from a user, but the remote machine may discover that it has never seen this user before. The remote machine then may require the user to authenticate itself to the remote machine. However, the distributed service function may not know how the authentication is to be performed. If the distributed service function determined how the authentication process is to be performed, this would limit the users of the distributed service function of an operating system to the one predetermined authentication scheme. Furthermore, if the predetermined authentication scheme requires remote communications with the server, there is a variety of exceptions and failures which are difficult to provide for inside the kernel of the operating system at the point where the authentication process would need to be performed. If the communications to the authentication server breaks, and the authentication process is inside the kernel, all processing within the data processing system may come to a halt while the operating system kernel is waiting while trying to communicate with the remote authentication server.

SUMMARY OF THE INVENTION

It is therefore an object of this invention to provide a mechanism which is general enough to interface to any of the previously known authentication schemes.

The system and method of this invention defines an interface between an operating system providing distributed service functions and a user program providing an authentication scheme. This interface is well defined and highly structured such that the kernel of the operating system does not change at all depending upon the authentication services in the network that are being utilized. A program providing an authentication scheme can be interchangeable with other authentication programs whenever the authentication scheme changes in the network. In addition, utilizing a user program at the remote machine to perform the authentication allows the user program to be killed, restarted, and scheduled as a regular program without affecting the performance of the underlying operating system. The complexity of authentication lies in the program and not in the kernel of the operating system.

An authentication daemon program is used at both the user initiating node and the receiving service node. A set of message flows allows a distributed service function within the operating system to use the results of these authentication daemons in a way that is transparent to the distributed services function. The distributed services function merely passes the information back and forth without attempting to interpret the work of the authentication daemon. Accordingly, different authentication daemon programs using different authentication schemes can be used interchangeably within the network without affecting or changing the underlying distributed service function of the operating system. Likewise, the same distributed service function can be used within various networks having different authentication schemes in the authentication daemon used in each network.

More specifically, a request sent to a remote service that requires authentication includes an object called the authentication information object. This authentication information object and an associated authentication acknowledgement value are constructed, at the requestor's node, by the authentication daemon from information about the requestor. The contents of these authentication items and the means for their construction are preferably unknown outside of the authentication daemon itself. The authentication acknowledgement value is retained and the authentication information object is included in the message used for the request. The service, before performing the request, extracts the authentication information object from the request and passes it to a second authentication daemon running at the service's node. This second authentication daemon uses the authentication information object to authenticate the requestor according to the authentication policy supported by the daemons. The second authentication daemon also returns a second authentication acknowledgement value that is returned to the requestor in the reply to the request. This second authentication acknowledgement is compared with the first authentication acknowledgement previously retained by the requestor to ensure that the identity of the remote service is that of the intended service.

DESCRIPTION OF THE PREFERRED EMBODIMENT

Figure 1:
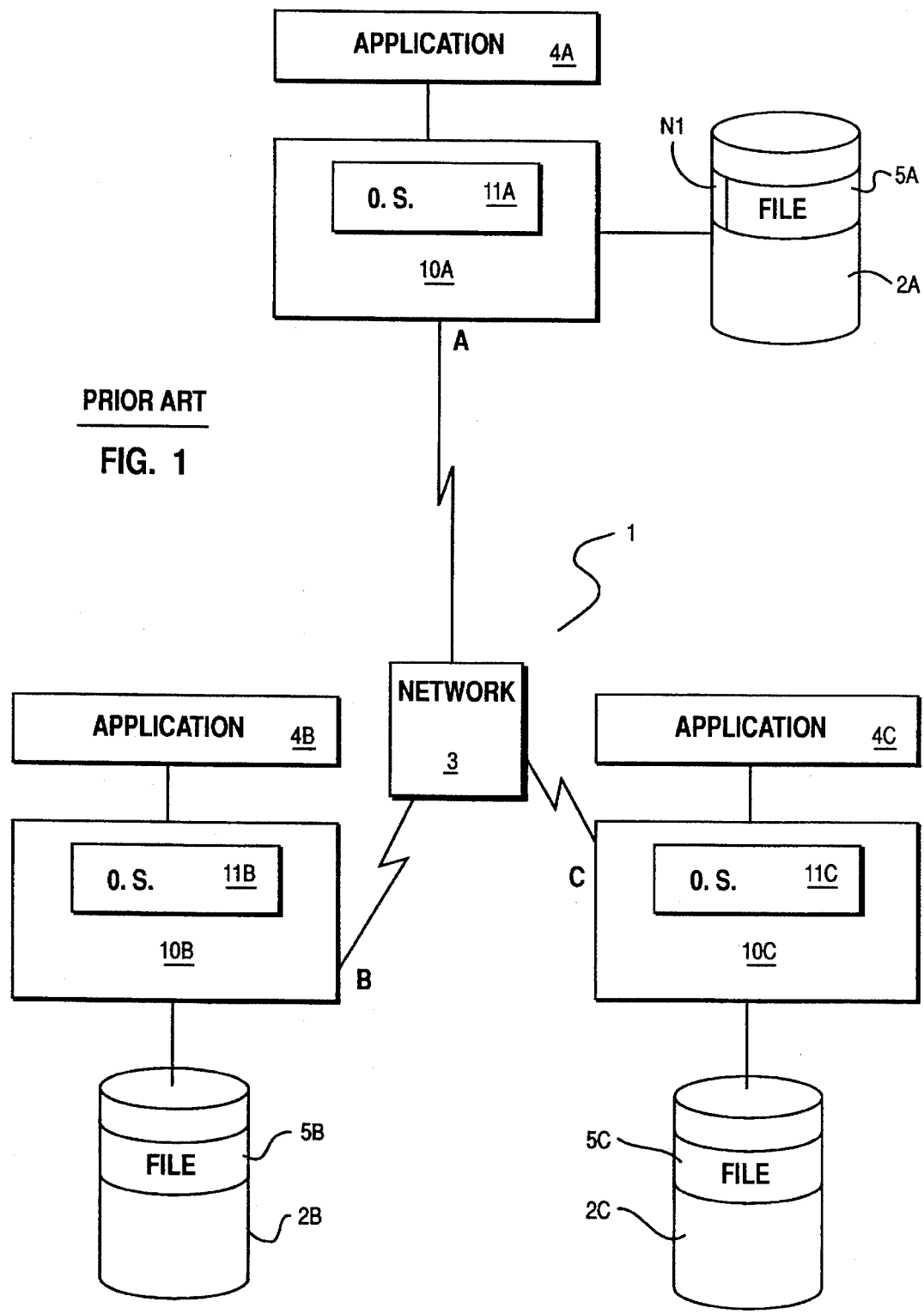
FIG. 1 is a block diagram of a distributed data processing system known in the art.
Figure 2:
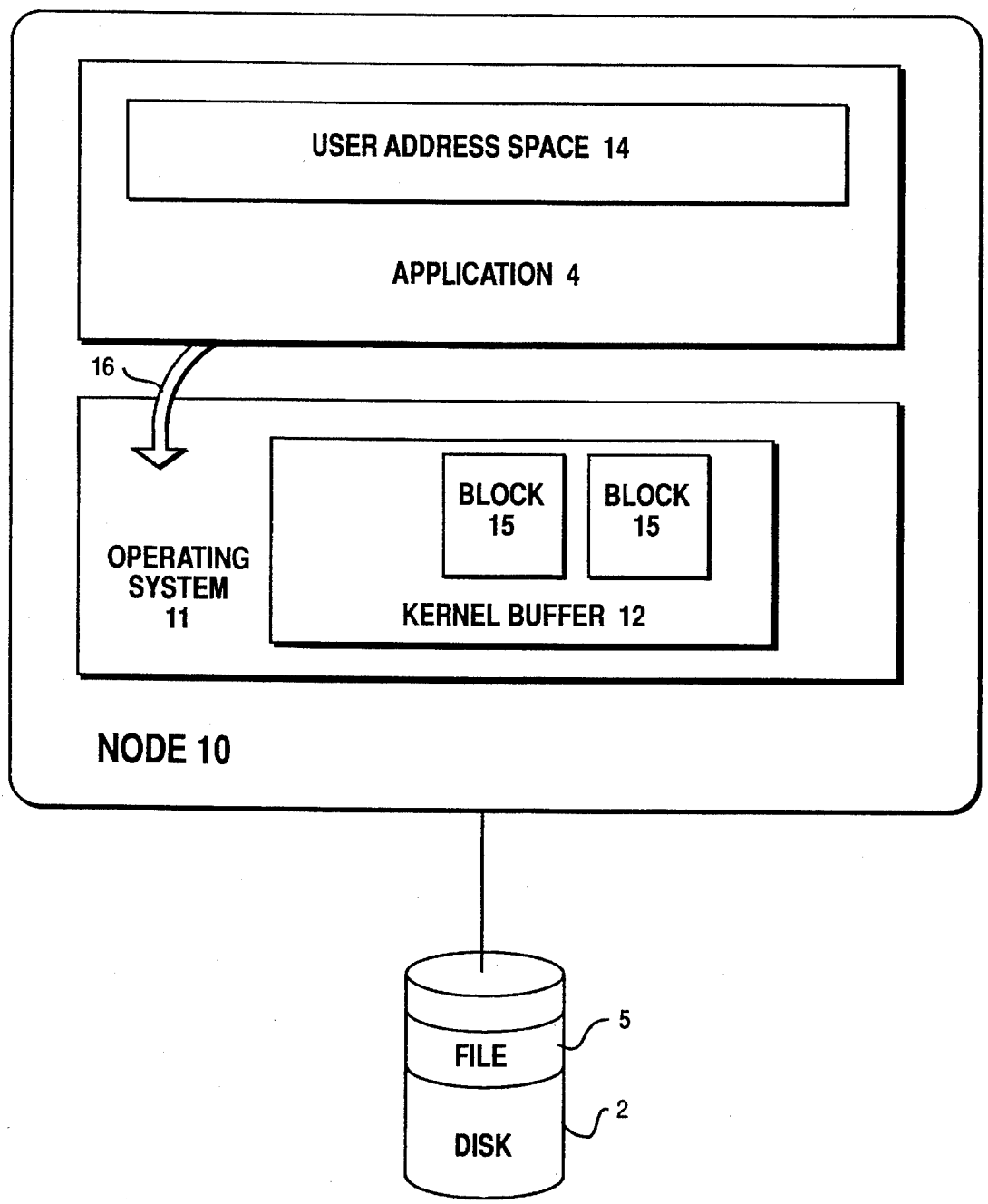
FIG. 2 is a block diagram showing a stand-alone data processing system known in the art for accessing a file through system calls.
Figure 3:
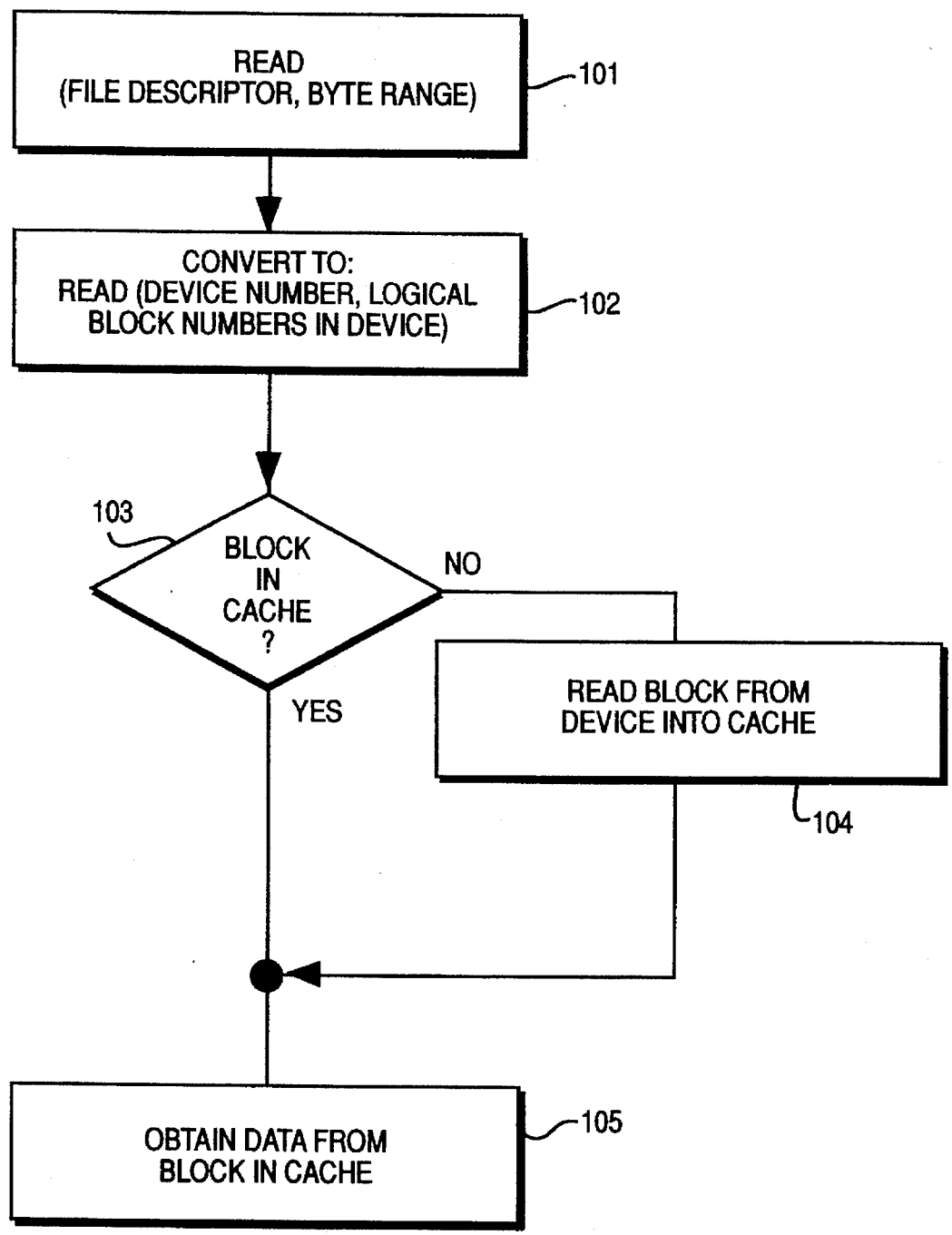
FIG. 3 is a flow diagram of the data processing system of FIG. 2 accessing a file through a system call.
Figure 4A:
FIG. 4A is a request_for_service message which is used by a process running on a client machine in order to request that a remote service be performed.
Figure 4A:
Figure 4A:
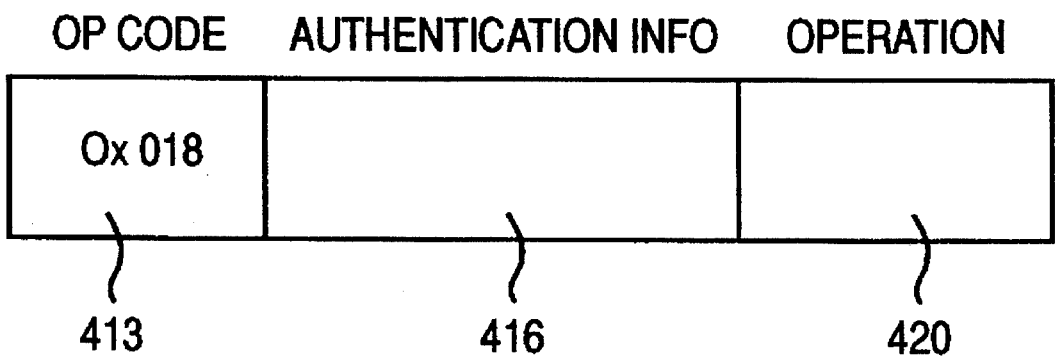
Figure 4A:
Figure 4A:
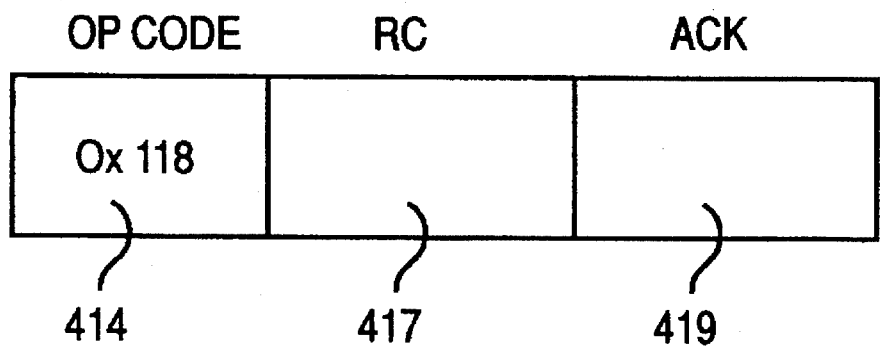

With reference to FIG. 4A, the internode message request_for_service 410 used herein is described. The request_for_service message 410 is used by a process running on a client machine in order to request that a remote service be performed. The request 411 has an opcode 413 indicating the specific operation requested. The request 411 also has an operation field 420 used to indicate the desired operation to be performed by the server. The authentication info field 416 in the request is used to pass enough information to the remote machine to authenticate the process performing the request. The remote machine responds with the reply 412. The opcode field 414 indicates that this is the reply for the particular kind of request. The return code (rc) 417 in the reply is used to indicate the success or failure of the remote machines attempt to execute the request. An acknowledgement is returned in the ack field 419. The ack is used to verify that correct identification between the requesting process and the remote machine has occurred.

Figure 4B:
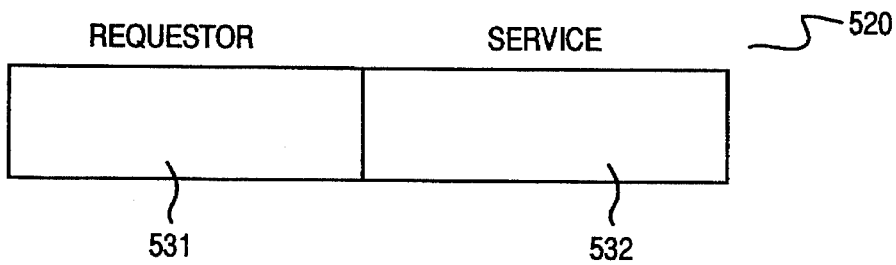
FIG. 4B illustrates the messages that flow between the authentication agent and the requestor and between the authentication agent and the service.
Figure 4B:
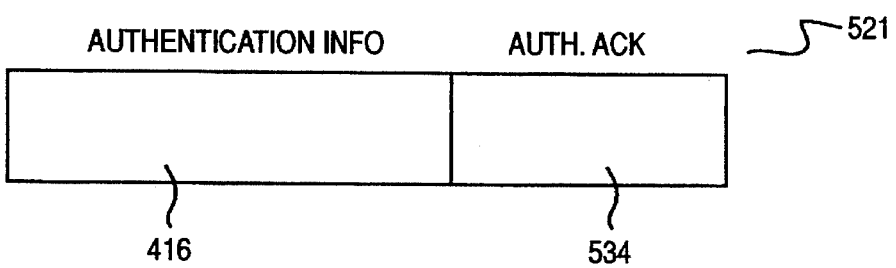
Figure 4B:
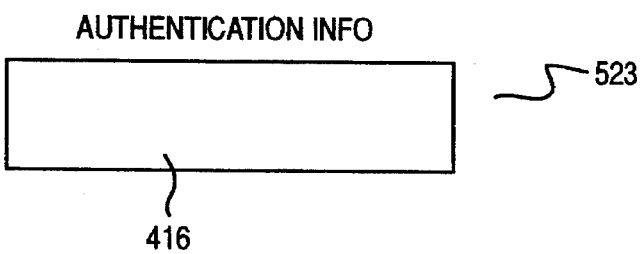
Figure 4B:
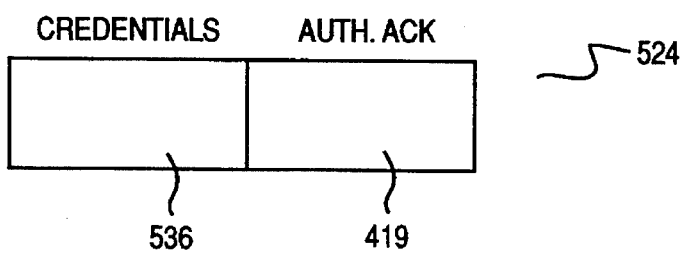

FIG. 4B shows the messages that flow between the authentication agent and the requestor and between the authentication agent and the service. The requestor to authentication agent message 520 contains information describing the requestor 531 and information describing the service 532 that the request will be sent to. The authentication agent to requestor message 521 contains an authentication information object 416 and an authentication acknowledgement value 534. The service to authentication agent message 523 contains only the authentication info object 416. The authentication agent to service message 524 contains another authentication acknowledgement value 419 and a set of credentials 536 that are used by the service to authenticate the requestor.

Figure 5:
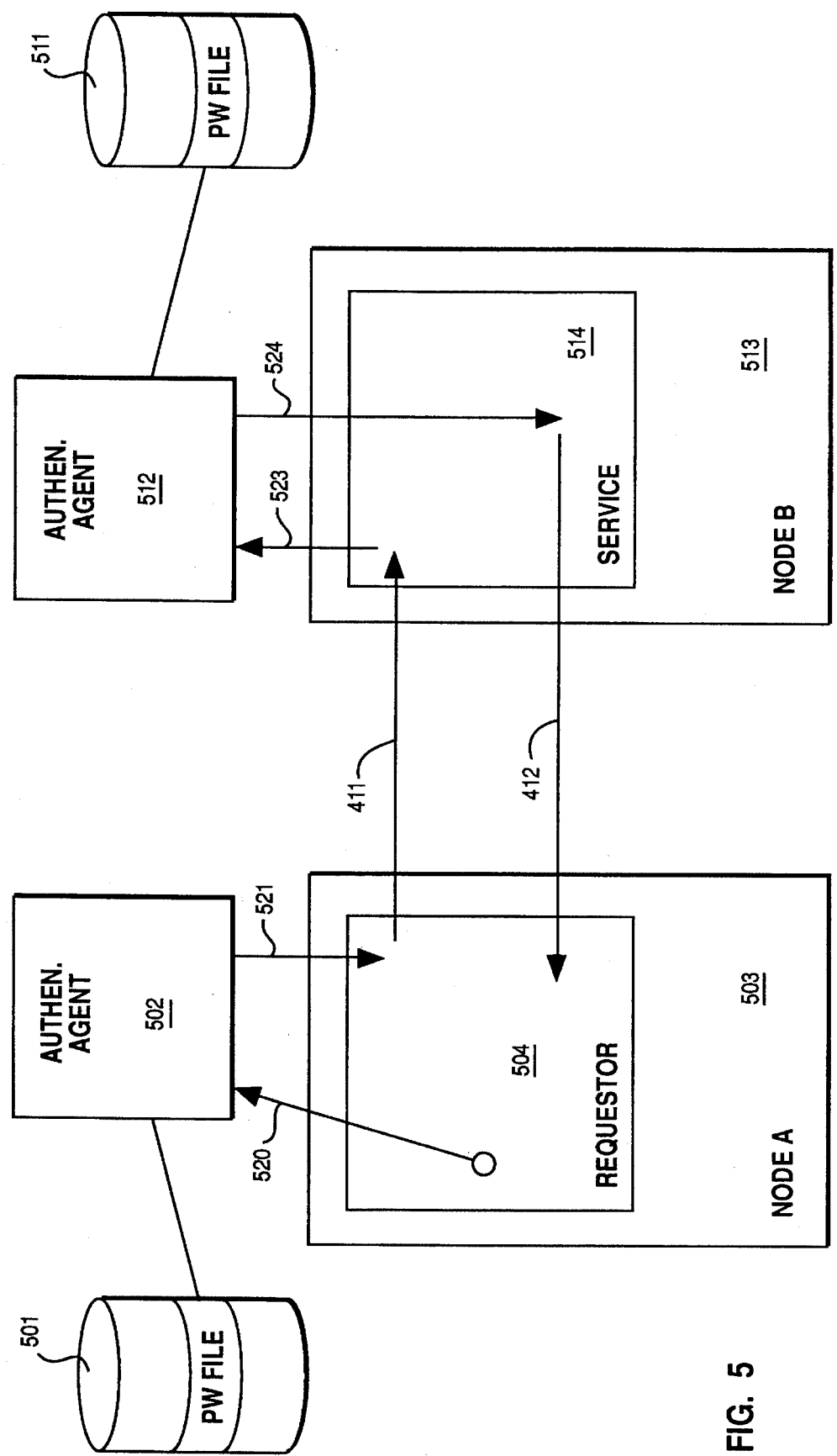
FIG. 5 shows a client data processing system and a server data processing system in a distributed data processing system having a separate authentication agent for performing authentication.
Figure 6:
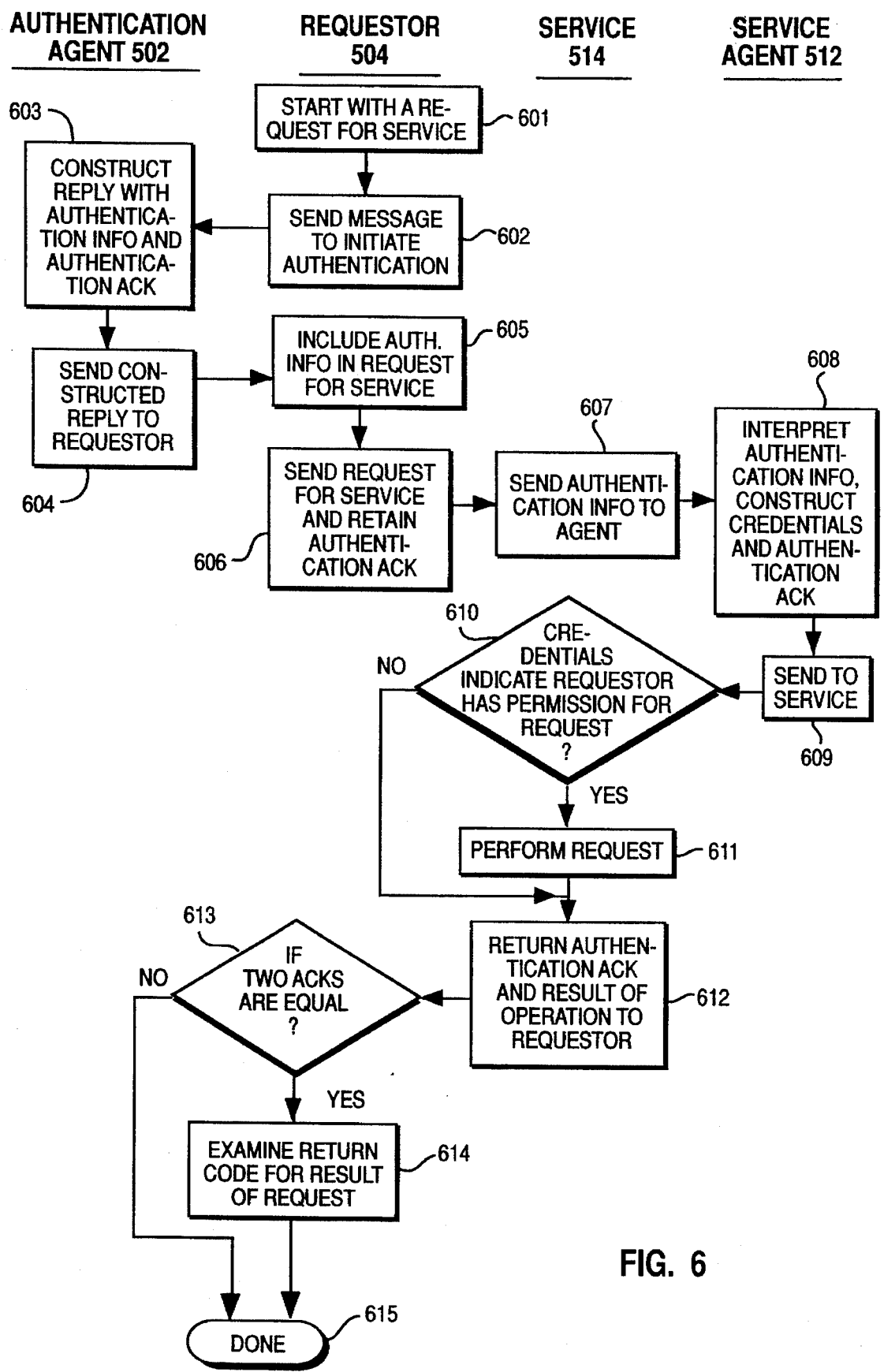
FIG. 6 is a flow showing the operations of the requestor, the authentication agent, and the service in the method of this invention.

Referring to FIG. 5, a machine 503 contains a requestor 504 that makes use of an authentication agent 502 through messages 520, 521. The authentication agent 502 refers to data stored on disk 501. A second machine 513 contains a service 514 that makes use of an authentication agent 512 through messages 523, 524. The requestor 504 communicates with the service 514 via the request_for_service request 411 and its reply 412.

In the preferred embodiment, a first machine 503 is communicating with a second machine 513 over a network. Rather than performing the authentication operation within the requestor process 504 and the service process 514, which may be running in an operating system of the machines, the authentication operation is performed in the authentication agent programs 502, 512 at both of the nodes. These authentication agents may be user level programs as used in systems running any type of operating system or daemons as used in systems executing the AIX operating system, or other operating systems based on the UNIX operating system.

The following description refers to FIG. 4A, FIG. 4B, FIG. 5, and FIG. 6, concurrently. Before a process at a first machine begins to send a request 411, step 601, to use the services of a second machine, an authentication procedure must first be performed. The requesting process 504 sends a message 520 to the first authentication agent 502 at the first node in order to initiate authentication, step 602. This message contains information 531 describing the process making the request and information 532 identifying the requested service.

The first authentication agent 502 uses the contents of the message 520 to construct a reply 521, step 603, returned to the requesting process, step 604. This reply 521 contains authentication information 416 and an authentication ack 534. The way in which the authentication agent uses the contents of message 520 depends upon the particular authentication policy being supported; but the way that the requesting process uses the reply 521 is independent of the policy supported by the authentication agent. The requesting process does not interpret either the authentication information 416 or the authentication ack 534. The only operations that the requesting process needs to perform with these elements are the transmission of the authentication information to the remote service in a request, steps 605, 606 and a bitwise comparison for equality between the authentication ack 534 received and retained, step 606, from the local authentication agent 502, and the authentication ack 419 in reply 412 received from the remote service.

In addition, the service receiving the request 411 does not need to interpret the information contained in the authentication information field 416. The service, like the requestor, treats the authentication information in the same manner independent of the authentication policy that it supports. The service always passes the authentication information to the authentication agent 512, step 607, where interpretation of this information is performed, step 608. The agent will find different contents in the authentication information message 523 depending upon the particular authentication policy being supported by the authentication agents 502 and 512. In the message 524 sent from the agent 512 to the service 514, step 609, the agent places a set of credentials 536 that describe the remote requestor in a manner that is meaningful to the service. Additionally, the agent places an authentication ack 419 in this message that does not need to be interpreted by the service. Like the authentication information, the authentication ack 419 is treated in the same manner by the service for all authentication policies supported by the authentication agents. The only operation that the service performs on the authentication ack 419 is returning it to the requestor in reply 412. The service makes a determination, step 610, based on the credentials 536 on the authentication and authorization of the requestor's permission to request an operation 420 of the service, conditionally performing the requested operation, step 611. The results of this determination and operation are returned in a return code 417 to the requestor in a reply message 412 along with the authentication ack 419, step 612.

The requestor receives the reply 412 and extracts the authentication ack 419 and compares it to the authentication ack 534 previously received from the local authentication agent 502, step 613. If the two acks are bitwise equal, the requestor is assured of the remote service's identity to the limit of the ability of the authentication protocol supported by the agents. Upon verifying the identity of the service, the requestor examines the return code 417 to determine the outcome of the original request, step 614, completing the request for service, step 615.

The following programming design language code illustrates the processing at the authentication agent.

```
/* authentication agent */
LOOP FOREVER
    await message;
    IF request is a requestor to agent message THEN
        use requestor information found in message
            along with the service information
            found in the message to construct both
            authentication information and
            an authentication acknowledgement;
        send message reply containing
            authentication information and
            authentication ack
            back to requestor;
    ELSE /* request is a service to agent message */
        use the authentication info to construct a
            set of credentials and
            an authentication ack;
        send message reply containing
            the set of credentials and
            the authentication ack
                back to service;
    ENDIF;
ENDLOOP;
                        Copyright IBM Corporations 1989
```

The following programming design language code illustrates the processing at the requestor.

```
/* requestor */
/* about to make a request of a remote service */
construct a message containing a description of the
    process making the request and a description of
    the remote service;
send this message to authentication agent;
await reply from authentication agent;
save the authentication ack returned in reply from
    agent;
construct a request for remote service, include
    authentication information returned in reply
    from the authentication agent;
send request to remote service;
await reply from the service;
IF authentication ack in reply from service
        = saved authentication ack THEN
        /* remote service authenticated */
        examine the result of the remote operation;
ELSE
        /* remote service not authenticated */
        /* ignore the returned return code */
ENDIF;
                        Copyright IBM Corporation 1989
```

The following programming design language code illustrates the processing at the service.

```
/* service */
LOOP FOREVER;
    await request from a remote requestor;
    extract the authentication information from the
        request;
    send authentication information to the
        authentication agent;
    await reply from agent;
    extract credentials for remote requestor from the
        reply;
    extract authentication ack from the reply and
        save it;
    IF credentials indicate that the requestor has
        permission to have the server perform the
        operation requested in the request from the
        requestor THEN
        perform the operation;
        return code := the results of the operation;
    ELSE
        return code := value indicating permission
                failure;
    ENDIF;
    construct a reply containing the return code and
        the saved authentication ack;
```

-continued

```
        send reply back to the server;
ENDLOOP;
              Copyright IBM Corporation 1989
```

Note, that the design suggested above employs messages to communicate between the service and the authentication agent and between the requestor and the authentication agent. These messages are shown in FIG. 4B. This choice of communication interface is intended to allow multiple processes, either requestors or services or combinations of the two, running on the same node to use a single agent. In the preferred embodiment using the AIX operating system, the interprocess communication facilities called message queues provide this type of interface. These message queue facilities are described in the "AIX Operating System Technical Reference", second edition, September 1986, order number SV21-8009, part number 74X9990, hereby incorporated by reference, and more specifically pages 2–71 to 2–85. These message queue facilities are described in the "AIX Operating System Technical Reference", second edition, September, 1986, order number SV21-8009, part number 74X9990, hereby incorporated by reference, and more specifically pages 2–71 to 2–85. This allows multiple processes to share the authentication daemon process. By using a well defined interface based on messages, the preferred embodiment allows the daemon process to be replaced without necessitating any changes in its clients, i.e., the requestors and the services.

For example, if Kerberos based authentication is being performed, the agent will acquire a Kerberos ticket for the requestor to use the remote service. This may involve searching id to name tables stored in the password file on disk 501 or ticket caches stored on disk 501 or memory. It may further involve communication with a remote Kerberos server using the Kerberos protocols. If Kerberos is used, the authentication info 416 contains all of the information that is needed by a service to authenticate a remote requestor using Kerberos.

To illustrate how the preferred embodiment can be used to support the Kerberos protocol, the steps performed by the authentication agent are further described. Message 520 to the authentication agent is used by the agent to determine the requesting process's associated user id. In the preferred embodiment, this id is contained in the field 531 describing the requestor and is a small integer used to identify the user on whose behalf the request is running. The authentication agent uses this id to locate the Kerberos tickets owned by this user. In the preferred embodiment, the agent will find these tickets in a file located on the disk 501 under the name /tmp/tkt(uid) where (uid) is the actual user id. In this file, a ticket for the requested service described by field 532 may be found. If such a ticket is not found, a new ticket for the requested service is acquired by the agent. The agent acquires a new ticket by sending a ticket request to the Kerberos ticket granting service. This ticket request is constructed according to the requirements of the Kerberos protocol as described in "Kerberos Authentication and Authorization System", Miller, S. P. et al. Basically, the agent constructs an encrypted authenticator containing a timestamp and sends it, along with a ticket for use of the ticket granting service, to the ticket granting service in its requests for a ticket to the desired service.

In response to the ticket request, the authentication agent will receive from the ticket granting service a ticket for the desired service and a session key for use with this service. The agent will also construct an authenticator encrypted with the session key an combine this with the ticket just received. The agent places this in the authentication info field 416 of the reply 521 that is returned to the requestor. Additionally, the agent will construct an authentication ack from the value of the timestamp placed in the encrypted authenticator. It does this by adding one to the timestamp and encrypting it with the session key. This authentication ack is placed in field 534 of the reply.

The requestor, upon receiving the reply 521, does not need to be aware that the authentication field and the authentication ack are constructed in order to take advantage of the Kerberos authentication protocols. Instead, the requestor treats these as abstract values, handling them in the same way independent of the way in which the authentication agents are performing authentication. The authentication info field is sent to the remote service in message 411 where it is passed in message 523 to the authentication agent running at the remote node. The remote authentication agent obtains, from the ticket, verification of the remote requestor's identity and the session key, that will be used with this remote requestor. This information is encrypted in the ticket in a manner which makes tickets unforgable. Additionally, the remote agent checks the authenticator sent with the ticket, decrypting it with the session key, to find the timestamp. The timestamp is examined to make sure that this request is not a replay of a previous request. The timestamp is also used to construct an authentication ack in the same manner as was done by the first authentication agent. The authentication ack is returned to the service in field 419 along with a description of the requestor's identity in field 536 of message 524. The ack constructed at the service authentication agent is then returned in message 412 to the requestor where it is compared to the authentication ack constructed at the requestor's node. This completes a Kerberos based authentication scheme using the preferred embodiment.

While performing the above described request, the agent communicates with the Kerberos ticket granting service. This may be running on a remote node and hence require network communication. This is not a problem for the agent since it is a regular scheduled process which can be put to sleep while awaiting a reply from the Kerberos ticket granting service without adversely impacting the performance of other processes on the system where the agent is running. If the requestor had attempted to acquire the tickets directly without going through an authentication agent, the requestor might have to sleep awaiting an I/O request. This could impact system performance adversely if the requestor was running under kernel state in some operating systems. Furthermore, some operating systems cannot initiate I/O such as this while in the middle of processing a previous I/O request for a process. This can occur if a process attempts to perform I/O on a remote file. While in the middle of an I/O request for a remote file, it may be discovered that authentication operations need to be performed that involve I/O such as communicating with the Kerberos ticket granting service, causing problems in systems where a separate authentication agent is not used. In this preferred embodiment, authentication operations can be performed by the separate agent while a requesting process is in a state where it would not be able to perform the I/O necessary for the authentication at that time.

Likewise, a different authentication policy can be used in conjunction with this preferred embodiment. When the authentication agent receives-message 520 it obtains the user id from field 531. It should be noted that in the preferred embodiment all information that might be used by an authentication policy is passed in field 531 so that different implementations of a policy or different policies running in the agent will find all information needed in this field. The user id is used to search the password file on disk 501 for a password that this user has prearranged to use with the remote service identified by field 532. This password and an associated reply password are obtained by this lookup operation. The password is placed in field 416, the authentication info field, and the reply password is placed in field 534, the authentication ack field, of the message 521. The requestor sends the authentication info field 416 to the service where it is passed to the remote agent in message 523. The remote agent uses the password to search a file stored on disk 511 to locate a description of the identity of the requestor. If found, this identity information is placed in field 536 along with a reply password found in the same file and placed in field 419, the authentication ack field of message 524. The service returns the authentication ack value to the requestor where it, the reply password found at the service node, is compared with the authentication ack obtained from the requestor authentication agent, the reply password found in the local file. If they are the same, successful mutual authentication has occurred.

Another possible authentication policy might be implemented with a centralized authentication system. Like the scheme just described, the authentication info field is a password passed from the requestor to the service and checked in the service authentication agent. The authentication ack is a reply password passed to the requestor from both the requestor authentication agent and the service, which obtains it from the service authentication agent. Instead of finding these passwords in files on disks 501, 511, these passwords are obtained from a centralized authentication system by the agent.

Finally, the agents may be in direct communication with each other. This allows authentication policies that work outside of the network used for request for service operations to be supported. For example, a physically secured communication channel between the agents could be used to dynamically determine appropriate authentication info values and authentication ack values. Requestors and services can communicate over lower cost or more available communication channels while achieving secure authentication through the use of the preferred embodiment where the agents communicate over a single secure channel.

It should be noted that the process acting as the authentication agent in a node can act in both roles, as the requestor authentication agent and the service authentication agent because both services and requestors may be running in the same machine.

Simply by disconnecting the authentication daemons, and replacing them with another authentication daemon program, the network can perform authentication using any authentication scheme. For example, the authentication daemon could perform either a centralized authentication scheme or a Kerberos authentication scheme. Alternatively, the authentication daemon may simply just examine a file containing passwords.

As shown above, the authentication of remote users by servers can be performed in various ways. Under some circumstances, there is very little reason to be suspicious of requests arriving at a server and low cost authentication of remote users is justified. In other environments, servers must exercise greater vigilance. No one policy will be best for all cases. Therefore, this invention supports a range of authentication and authorization policies.

While the invention has been particularly shown and described with reference to a preferred embodiment, it will be understood by those skilled in the art that various changes in form and detail may be made without departing from the spirit and scope of the invention.

We claim:

1. A system for authenticating a requestor process at a first node, of a service process running at a second node in a distributed data processing system, comprising:

a first machine at said first node;

a second machine at a second node; and communication means interconnecting said first and said second machines;

said first machine executing
an operating system;
said requestor process, and
a first authentication agent program defining a corresponding first authentication policy independently of said operating system;

said first machine further including means for constructing authentication information and a first authentication acknowledgement supporting said first authentication policy;

said second machine further executing
an operating system;
said service process, and
a second authentication agent program defining a corresponding second authentication policy independently of said operating system;

said second machine further including means for receiving and processing said authentication information communication from said first machine to said second machine over said communication means;

means for acquiring and transmitting a second authentication acknowledgement on said communication means from said second machine to said first machine;

and wherein said first machine further includes means for comparing said first authentication acknowledgement and said second received authentication acknowledgement for determining a second authentication of said service process.

2. The apparatus of claim 1 wherein said first authentication policy differs from said second authentication policy.

3. A method for authentication a requestor process at a first node of a service process running at a second node in a distributed data processing system comprising:

executing in a first machine
an operating system;
said requestor process; and
a first authentication agent program defining a corresponding first authentication policy independently of said operating system;

constructing with said first machine authentication information and a first authentication acknowledgement supporting said first authentication policy;

executing in a second machine
an operating system;
a service process; and
a second authentication agent program defining a corresponding second authentication policy independently of said operating system;

receiving and processing with said second machine said authentication information communicated from said machine to said second machine;

acquiring and transmitting with said second machine a second authentication acknowledgement from said second machine to said first machine; and comparing with said first machine said first authentication acknowledgement and said second received authentication acknowledgement for determining a second authentication of said service process.

4. The method of claim 3 further including deleting said second authentication agent program and substituting therefore a corresponding third authentication policy independently of said operating system.

* * * * *